US012304235B2

(12) United States Patent
Parker et al.

(10) Patent No.: US 12,304,235 B2
(45) Date of Patent: May 20, 2025

(54) JAM RESISTANT CHALK REEL

(71) Applicant: Stanley Black & Decker, Inc., New Britain, CT (US)

(72) Inventors: Gregory David Parker, Charlotte, NC (US); Kan-Ping Lo, Taichung (TW); Gabriel A. Haboubi, Abingdon, MD (US)

(73) Assignee: Stanley Black & Decker, Inc., New Britain, CT (US)

(*) Notice: Subject to any disclaimer, the term of this patent is extended or adjusted under 35 U.S.C. 154(b) by 0 days.

(21) Appl. No.: 18/411,749

(22) Filed: Jan. 12, 2024

(65) Prior Publication Data

US 2024/0140136 A1 May 2, 2024

Related U.S. Application Data

(63) Continuation of application No. 17/698,243, filed on Mar. 18, 2022, now Pat. No. 11,872,838.

(51) Int. Cl.
*B44D 3/38* (2006.01)
*B65H 75/40* (2006.01)
*B65H 75/44* (2006.01)

(52) U.S. Cl.
CPC ............ *B44D 3/38* (2013.01); *B65H 75/406* (2013.01); *B65H 75/4431* (2013.01)

(58) Field of Classification Search
CPC ..... B44D 3/38; B65H 75/406; B65H 75/4431
See application file for complete search history.

(56) References Cited

U.S. PATENT DOCUMENTS

| | | | | |
|---|---|---|---|---|
| 999,641 | A * | 8/1911 | Wedgwood | B65H 75/406 242/389 |
| 11,872,838 | B2 * | 1/2024 | Parker | B65H 75/406 |
| 2018/0244100 | A1 * | 8/2018 | Usui | B43L 13/00 |
| 2023/0294451 | A1 * | 9/2023 | Parker | B44D 3/38 33/414 |
| 2024/0140136 | A1 * | 5/2024 | Parker | B65H 75/406 |

FOREIGN PATENT DOCUMENTS

GB 553446 A * 12/1941

* cited by examiner

*Primary Examiner* — Yaritza Guadalupe-McCall
(74) *Attorney, Agent, or Firm* — Gabriel A. Haboubi

(57) ABSTRACT

A chalk reel includes a housing defining a chalk chamber and an opening from the chalk chamber; a spool positioned within the chalk chamber; and a line wound on the spool and extending through the opening, the line having a width of dimension X. The spool comprises an axial hub and a sidewall. The sidewall comprises a plurality of apertures extending through the sidewall from a first face distal from the axial hub to a second face proximal to the axial hub. Each of the plurality of apertures having a maximum width of dimension Y. The dimension Y is sized so that no loops of the line may fit through each of the plurality of apertures.

16 Claims, 7 Drawing Sheets

JAM RESISTANT CHALK REEL

CROSS REFERENCE

This application is a continuation of U.S. patent application Ser. No. 17/698,243, filed Mar. 18, 2022, and issuing as U.S. Pat. No. 11,872,838 on Jan. 16, 2024, titled "JAM RESISTANT CHALK REEL," the entire contents of which are hereby incorporated by reference herein.

FIELD OF THE INVENTION

The present invention relates generally to layout tools, and more particularly to chalk line marking devices commonly referred to as chalk reels, chalk spools, chalk boxes or chalk lines (hereinafter referred to as "chalk reels").

BACKGROUND OF THE INVENTION

Chalk reels are known that consist of a spool on which a line or string is wound. The spool, line and the drive transmission for the spool are supported in a housing. The drive transmission may comprise gears, springs and other components that connect the spool to an external handle for rewinding the line on the spool after use. A chalk chamber is filled or partially filled with a colored chalk such that as the line that is wound on the spool it is coated in chalk. The line can be unwound from the housing through an aperture in the housing such that it can be "snapped" on a surface to form a line of chalk on the surface. The resulting line of chalk can be used as a reference line in construction or other applications. Features of conventional chalk reels include those found in U.S. Pat. No. 9,701,154, incorporated herein by reference in its entirety.

SUMMARY OF THE INVENTION

According to an embodiment, a chalk reel includes a housing defining a chalk chamber and an opening from the chalk chamber; a spool positioned within the chalk chamber; and a line wound on the spool and extending through the opening, the line having a width of dimension X. The spool comprises an axial hub and a sidewall. The sidewall comprises a plurality of apertures extending through the sidewall from a first face distal from the axial hub to a second face proximal to the axial hub. Each of the plurality of apertures having a maximum width of dimension Y. The dimension Y is sized so that no loops of the line may fit through each of the plurality of apertures.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of chalk reels in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Relative terms such as "below" or "above" or "upper" or "lower" or "horizontal" or "vertical" or "top" or "bottom" may be used herein to describe a relationship of one element, component or region to another element, component or region as illustrated in the figures. It will be understood that these terms are intended to encompass different orientations of the device in addition to the orientation depicted in the figures.

Figure 1:
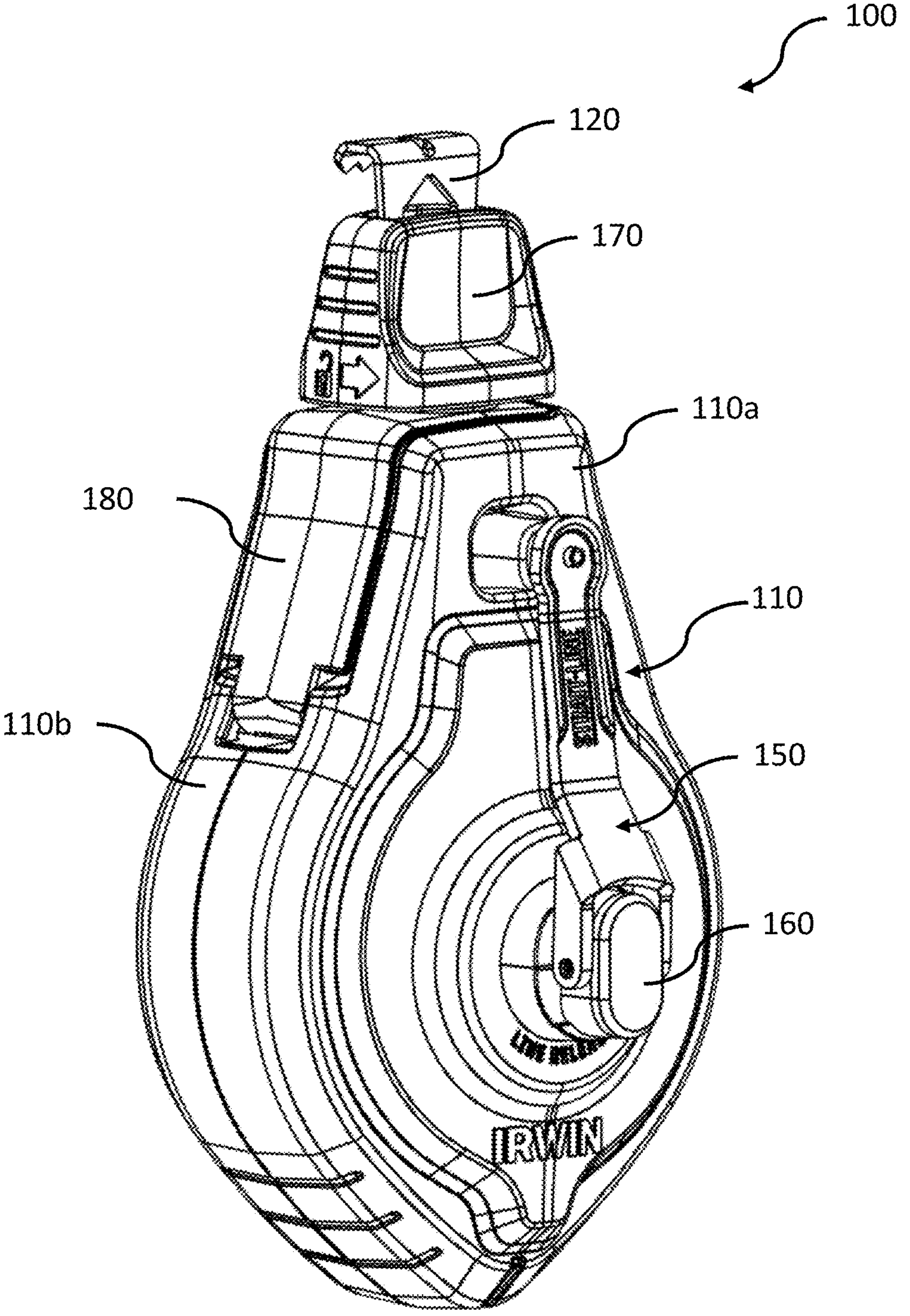
FIG. 1 illustrates a perspective view of an embodiment of a chalk reel of the present invention.

As shown in FIG. 1, a chalk reel 100 includes a housing 110 that forms a chalk chamber. In an embodiment, the housing 110 includes a front housing section 110*a* and a rear housing section 110*b*, which may be connected together by fasteners (not shown) such as threaded screws or other releasable connection mechanisms such that the housing sections may be separated or formed separately and assembled together. Selectively extendable from the housing 110 is a hook 120 that is coupled to a line (e.g., in the illustrated embodiment, line 130 in FIG. 2). As discussed in greater detail below, the line 130 is wound around a spool (e.g., in the illustrated embodiment, spool 140 in FIG. 2) within the chalk chamber, such that chalk in the chalk chamber may contact and adhere to the line 130. The line 130 may be formed of any appropriate material, including but not limited to nylon, polyester, or cotton, which in some embodiments may be twisted or braided. It may be appreciated that when a user pulls on the hook 120 may cause the spool 140 to rotate and release the line 130 with the chalk adhered thereto. Accordingly, once the line 130 is extended from the housing 110, and the hook 120 has engaged or bit into a distant surface, snapping the line relative to the hook 120 and the housing 110 will displace chalk to form a reference chalk mark on a substrate between the hook 120 and the housing 110.

In the illustrated embodiment, the chalk reel 100 has a winding handle 150 that facilitates rotating the spool 140 to retract the line 130 and hook 120 into the housing 110. As shown, the winding handle 150 may be pivotable, and as such may move from a compactified storage position to an extended winding position. In some embodiments, the chalk reel 100 may have a gearing system that provides a mechanical advantage for more rapidly retracting the line 130 and hook 120 into the housing 110. In some such embodiments, the chalk reel 100 may include a clutch that may disengage the winding handle 150 from the spool 140, so that the winding handle 150 does not rotate when the hook 120 or line 130 is being pulled directly. As shown, a line release actuator 160 may be included in the chalk reel 100 to actuate such a clutch, and in the illustrated embodiment may be operatively positioned between the winding handle 150 and the spool 140 (or more specifically between the winding handle 150 and the gearing system, not shown) to disengage the spool 140 from the gearing system and/or the winding handle 150.

Before turning to the salient internal features of the chalk reel 100, it may further be appreciated from FIG. 1 that the chalk reel 100 may include one or more doors to open the chalk chamber to permit filling the chalk chamber with chalk. As shown, in an embodiment the chalk reel 100 may include a nose door 170, which may selectively receive the hook 120, and through which the line 130 may extend. In an embodiment, by rotating the nose door 170 (e.g., by unscrewing it where it includes a threaded fastener, or through known quarter turn or half turn unlatching with a seal member), the nose door 170 may be separated from the housing 110, and an opening to the chalk chamber may be exposed for insertion of the nose of a chalk refill bottle. In the illustrated embodiment a hinged door 180 is also included, and configured such that once the nose door 170 is separated from the housing 110, the hinged door 180 may be further opened to provide a wider opening into the chalk chamber to facilitate easier refilling of chalk into the chalk chamber.

Figure 2:
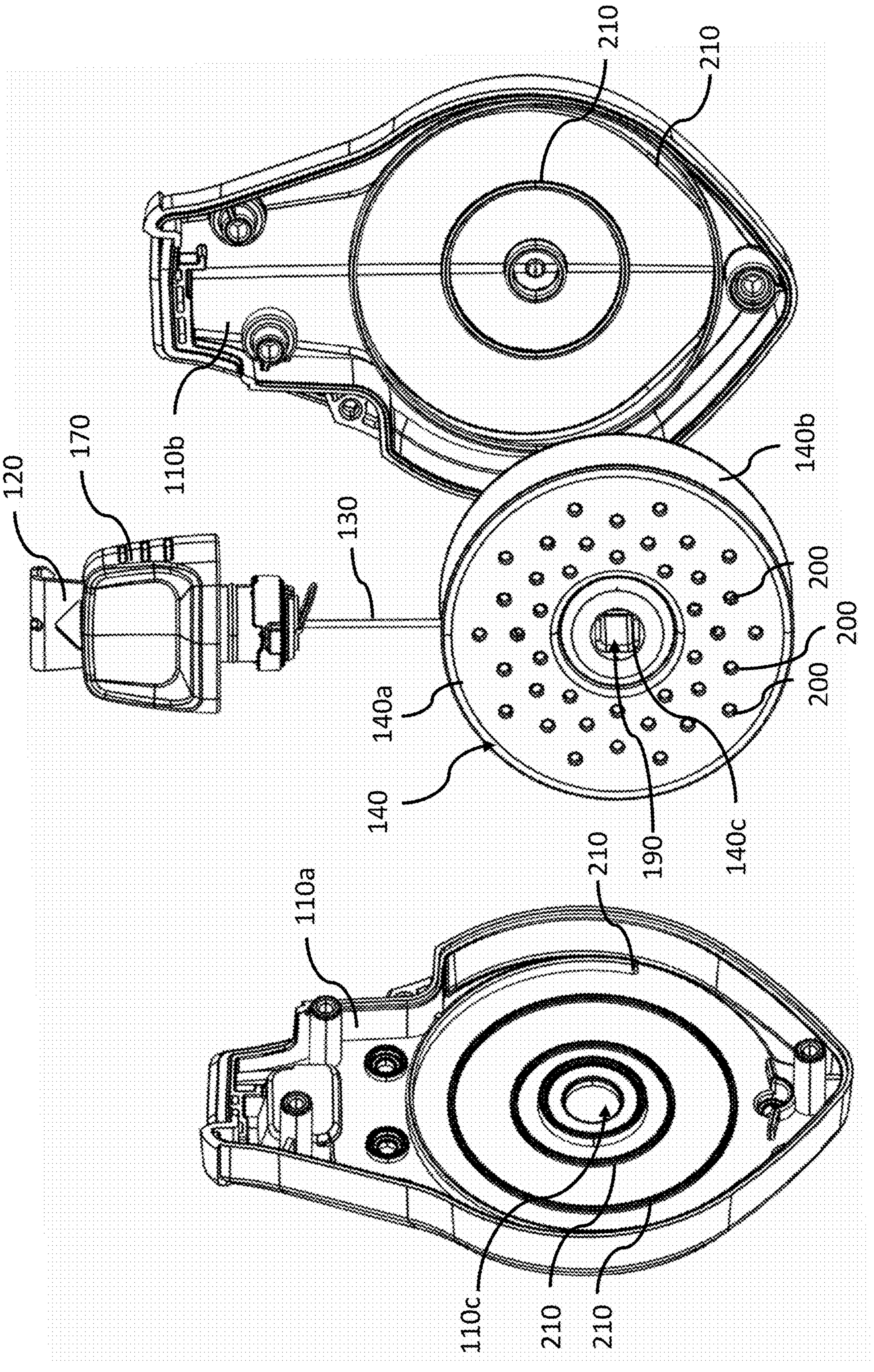
FIG. 2 illustrates an exploded view of selected portions of the chalk reel of FIG. 1, including a line and a spool thereof.

Turning to FIG. 2, the line 130 and spool 140 may be more fully appreciated, as well as their interaction with the inside of the housing 110 defining the chalk chamber. It may be appreciated that the spool 140 may have a spool axis feature 190 configured to engage with a winder axis feature (not shown) that would be fixed to the gearing system and/or the winding handle 150 and contact therebetween would be through an opening 110*c* in the housing 110. In the illustrated embodiment, the spool axis feature 190 is a receiver that would receive the winder axis feature extending through the opening 110*c*. As the line 130 is wrapped around the spool 140 when the line 130 and hook 120 are retracted into the chalk chamber, pulling the hook 120 from the housing 110 would pull the line 130 and rotate the spool 140. Thus, it may be appreciated that unless the clutch is disengaged through actuation of the line release actuator 160, rotation of the spool 140 may result in rotation of the winding handle 150 and/or the gearing system, which may slow or prevent free rotation of the spool 140 to release the line 130 for extension.

It is known in the art of chalk reels to include apertures in the spools, which permit permeation of chalk to interior windings of the line. For such reasons, these apertures, where included, are commonly large openings configured to maximize movement of chalk into the windings of the line carried by the spool, and move and aerate through the apertures into the spool as the spool is rotated. It is an aspect of the present disclosure to improve upon such spools.

In the illustrated embodiment, the spool 140 includes a first sidewall 140*a* and a second sidewall 140*b*, connected therebetween by an axial hub 140*c*. As shown, in the spool 140, the axial hub 140*c* defines the spool axis feature 190 configured to engage with the winder axis feature. A plurality of apertures 200 are formed in one or more of the first sidewall 140*a* and the second sidewall 140*b*, so as to extend from an exterior of the spool 140 to the interior of the spool 140 between the sidewalls 140*a* and 140*b*. The apertures extend from an exterior face of each sidewall 140*a* and 140*b* distal from the axial hub 140*c*, to an interior face proximal to the axial hub 140*c*. Accordingly, as the line 130 is wound around the axial hub 140*c*, chalk that is at the exterior of the spool 140 may enter the apertures 200 to contact windings of the line 130 closer to the axial hub 140*c*, and not be blocked by windings of the line 130 radially outward from the axial hub 140*c*. As further shown in FIG. 2, one or more of the front housing section 110*a* and a rear housing section 110*b*, at interiors thereof defining the chalk chamber and adjacent to the sidewalls 140*a* and/or 140*b* that contain the apertures 200, may include chalk aeration features 210, such as protruding grooves extending inwardly into the chalk chamber. It may be appreciated that such chalk aeration features 210 may scrape and push chalk in the chalk chamber as the spool 140 rotates, such that the chalk may be pushed into the apertures 200.

Figure 3:
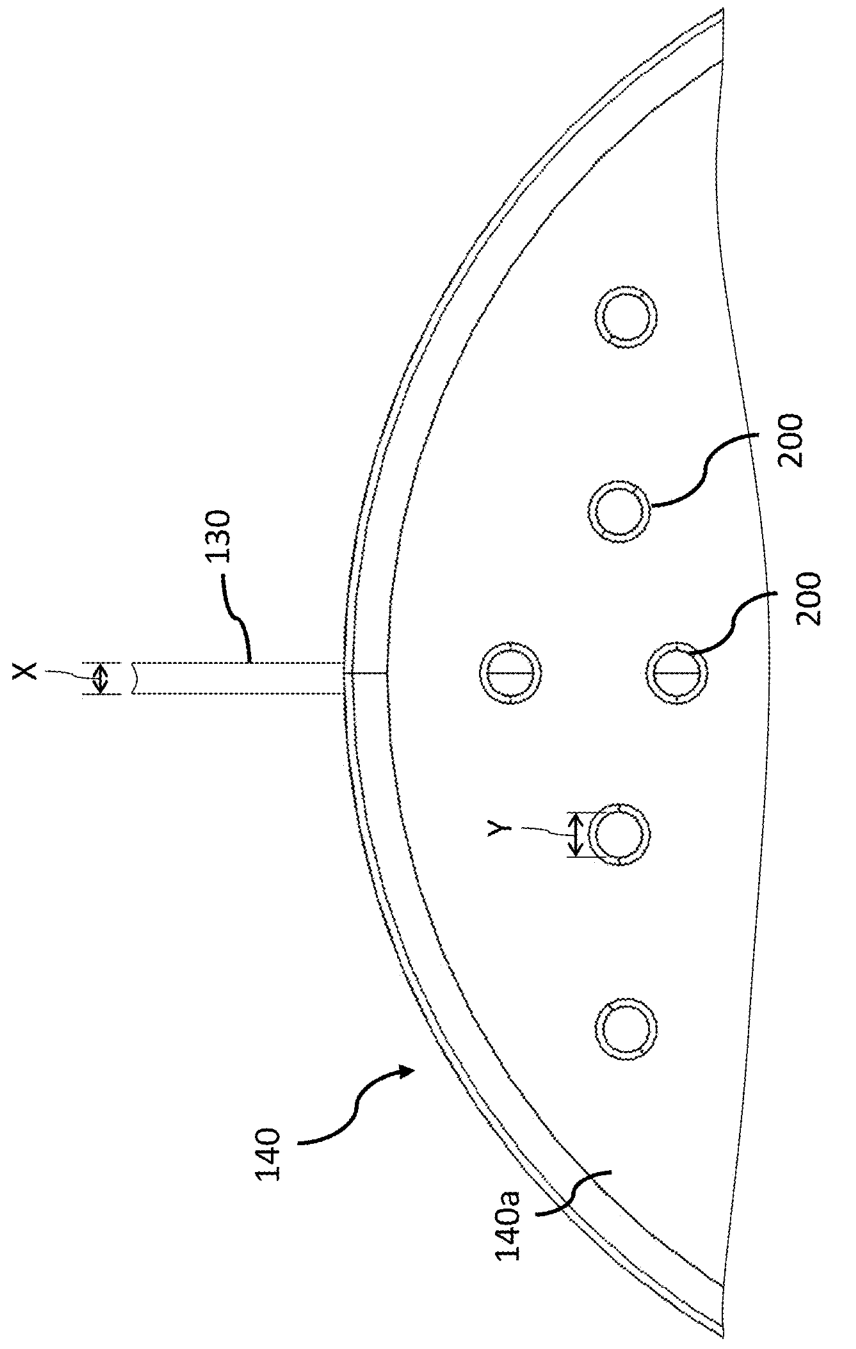
FIG. 3 illustrates an enlarged view of the line and spool of FIG. 2.

It may be appreciated that in conventional chalk reels, having large sized apertures, or even a generally skeletal or widely webbed configuration of spool, retracting the line and hook into the housing by winding the spool may result in the line getting tangled by the chalk in the chalk chamber thereof, such that the line protrudes through the apertures and becomes tangled in the spool, the gearing mechanism, or other movable portions of the chalk reel. Some such conventional chalk reels have incorporated features such as easy-open configurations so that the spool may be removed, and the line may be easily rewound around the spool. With reference to FIG. 3, it may be appreciated how the present disclosure innovates over such alternative solutions.

As shown in FIG. 3, it is a feature of the present disclosure that the apertures 200 formed in the spool 140 are dimensionally sized with a desired relationship relative to a width or thickness of the line 130. In particular, where the line 130 is cylindrical with a diameter of X, the apertures 200 formed in the illustrated sidewall 140*a* (and in such embodiments, in the obscured sidewall 140*b*) are sized such that a maximum dimension thereof in the plane of the sidewall 140*a* or 140*b* is a dimension Y, where Y is less than 2 times the dimension X. This dimension Y may be the diameter of the aperture 200 where the aperture 200 has a circular opening (e.g., a generally cylindrical shape), or may be the longest diagonal where the aperture 200 has a rectangular opening (e.g., a generally rectangular prism shape), or may be the longest internally bounded line segment that can be drawn in any other appropriately shaped opening for aperture 200. It may be appreciated that the apertures 200 may therefore have any appropriate shape, including but not limited to squares, slots, diamonds, rectangles, ovals, star shapes, or may have any other regular or irregular shape.

Accordingly, with this configuration where the dimension Y of the aperture is approximately less than or equal to twice dimension X of the line 130, no loop of the line 130, which would typically be at least 2 times X in dimension (unless the line 130 is compressed), may form that may fit through the dimension Y of the aperture 200. It may be appreciated that certain sizes of chalk reel 100 may be configured with larger or smaller chalk capacities and/or line lengths. As such, in some embodiments, the dimension X of the line 130 for a large capacity chalk reel 100 may be larger than the dimension X of the line 130 for a small capacity chalk reel 100, as a longer intended snap length and thus length of line 130 may make desirable a thicker line 130 for increased line strength. Accordingly, where a larger dimension X of line 130 is utilized (e.g., for a thicker line), a corresponding larger dimension Y of the aperture 200 may also be utilized, allowing more chalk to pass through the aperture 200 into the inner windings of the line 130 on the spool 140, provided that the aperture is not so large that loops of the line 130 may pass therethrough.

With regard to a distinction between a large capacity chalk reel and a small capacity chalk reel, it may be appreciated that in some embodiments the outer diameter of the spool 140 (e.g., a diameter of the sidewall 140*a* and/or the sidewall 140*b*) may range between approximately 45 mm and 130 mm in various embodiments, which may facilitate lengths of line 130 between approximately 8 meters feet long to approximately 46 meters long. In some embodiments, a diameter of the spool 140 may be approximately 60 mm in diameter, while in other embodiments the diameter of the spool 140 may be approximately 65 mm in diameter, and in still other embodiments, the diameter of the spool 140 may be approximately 127 mm in diameter.

Although it may be appreciated that the line 130 may be resilient and compressible, in some embodiments the dimension Y in the sidewall 140*a* may be appropriately sized so as to be less than twice dimension X when the dimension X is of the line 130 as uncompressed. In an embodiment, the dimension Y may be approximately 1.5 times the size of dimension X. In an embodiment, the dimension Y may be approximately the same as the dimension X. In some embodiments, the dimension Y may be smaller than the dimension X. In various embodiments, the dimension X of the line 130 as uncompressed may be approximately between 0.5 mm and 1.5 mm, and in some embodiments may be approximately 1 mm, for a smaller capacity/length line 130. In various embodiments, the dimension X of the line 130 as uncompressed may be approximately between 1.5 mm and 2.5 mm, and in some embodiments may be approximately 2 mm, e.g., for a larger capacity/length line.

In some embodiments, the dimension Y of the sidewall 140*a* may be appropriately sized based on a possible compression of the line 130. In an embodiment, the dimension Y may be approximately 1.5 times the size of dimension X as compressed. In an embodiment, the dimension Y may be approximately the same as the dimension X as compressed. In some embodiments, the dimension Y may be smaller than the dimension X as compressed. In an embodiment, compression of the line 130 may reduce the dimension X of the line 130 to approximately between 0.25 mm and 0.75 mm, and in some embodiments may be approximately 0.5 mm, for a smaller capacity/length line 130. In various embodiments, the dimension X of the line 130 as compressed may be approximately between 0.75 mm and 1.25 mm, and in some embodiments may be approximately 1 mm, e.g., for a larger capacity/length line.

It may be appreciated in such embodiments though, the dimension Y of the sidewalls 140*a* or 140*b* would remain sufficiently large to permit permeation of chalk particles through the apertures 200, and would not be so small as to be functionally the same as having a solid sidewall 140*a* without apertures 200. Accordingly, in some embodiments the dimension Y of the apertures 200 may be as small as 1 mm, in particular where the apertures 200 are formed as molded into a plastic spool 140, as smaller sizes may increase molding difficulties. As discussed in greater detail below, however, by using a mesh material or a perforated material to define the apertures 200, the dimension Y of the apertures 200 may be significantly smaller, and may be closer in size to (although larger than) the typical size of grains of chalk (e.g., 0.015 mm). In various embodiments, the dimension Y of the apertures 200 may be approximately between 0.5 and 5 mm, and in some embodiments may be approximately 4 mm where the dimension X of the line 130 is approximately 2 mm, and may be approximately 2 mm where the dimension X of the line 130 is approximately 1 mm.

As shown in FIG. 3, by having relatively smaller apertures 200, the sidewalls 140*a* (and in such embodiments, the sidewalls 140*b*) may accommodate a large number of such apertures 200. In an embodiment, the sidewall 140*a* may include at least ten apertures 200. In embodiment, the sidewall 140*a* may include at least twenty apertures 200. In an embodiment, the sidewall 140*a* may include at least thirty apertures 200. In an embodiment, the sidewall 140*a* may include at least forty apertures 200. As shown in the illustrated embodiment, with reference to the view of FIGS. 4A-4F, where a generally planar surface of the sidewall 140*a* is symmetrical to a generally planar surface of the sidewall 140*b* (e.g., excluding the axial hub 140*c*), the spool 140 as a whole may contain generally the same number apertures 200 on the sidewall 140*a* and the sidewall 140*b*. As such, in the illustrated embodiment, the spool 140 includes approximately eighty apertures 200.

In some embodiments, the number of apertures 200 on each sidewall 140*a* and 140*b* may differ. While in the illustrated embodiments the apertures 200 are generally symmetrically arranged on the sidewalls 140*a* and 140*b*, in other embodiments the apertures 200 may be asymmetrically positioned, and in some embodiments may be randomly positioned. In some embodiments, the apertures 200 may be appropriately placed on the spool 140 so as to align with appropriately placed chalk aeration features 210 in the chalk chamber, so as to create a desired movement of chalk from the chalk aeration features 210 into the apertures 200.

Figure 4A:
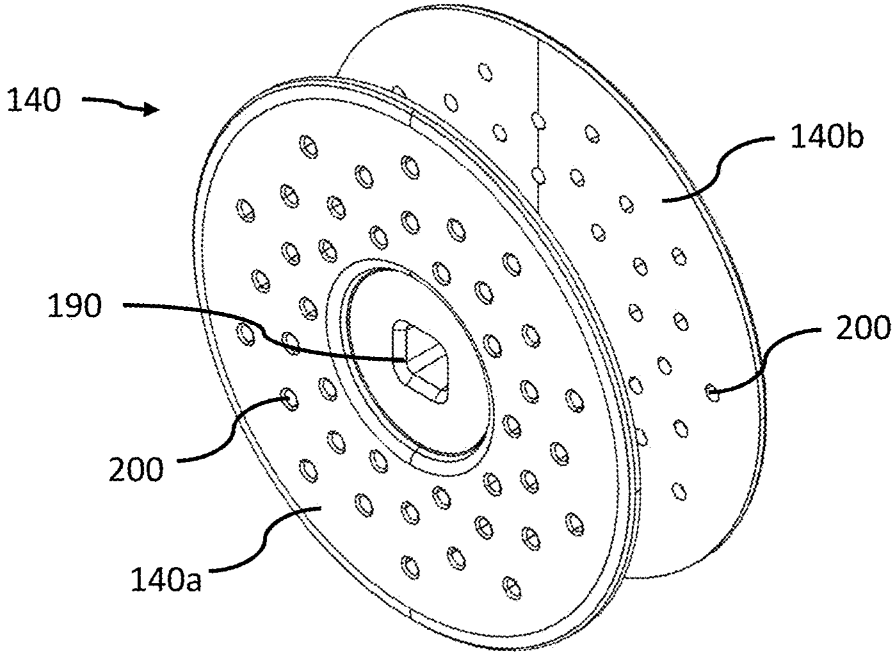
FIGS. 4A-4F illustrate front perspective, rear perspective, front, rear, side, and top views of the spool of the illustrated embodiment respectively, where an opposing side view would be mirrored symmetrical to the illustrated side view, and a bottom view would be mirrored symmetrical to the top view.
Figure 4B:
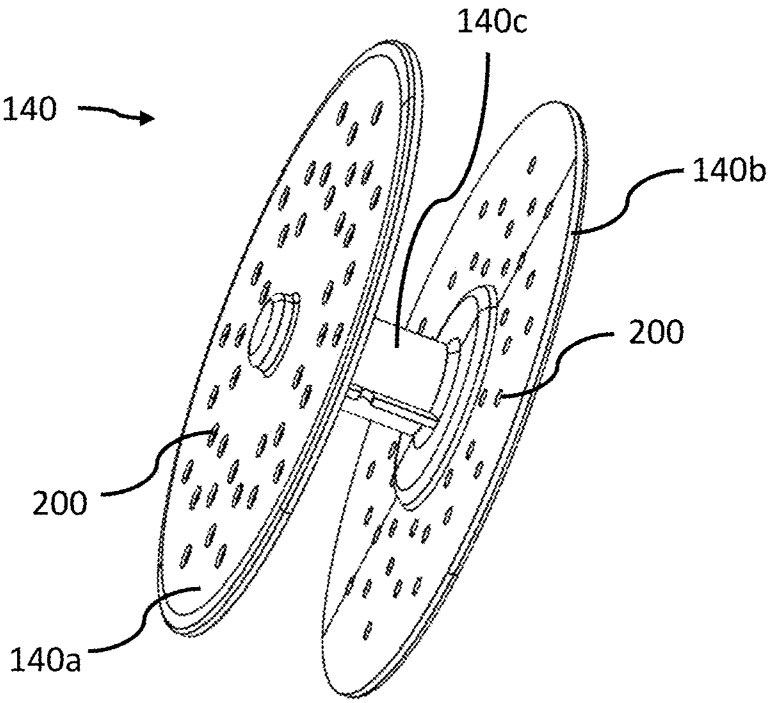
Figure 4C:
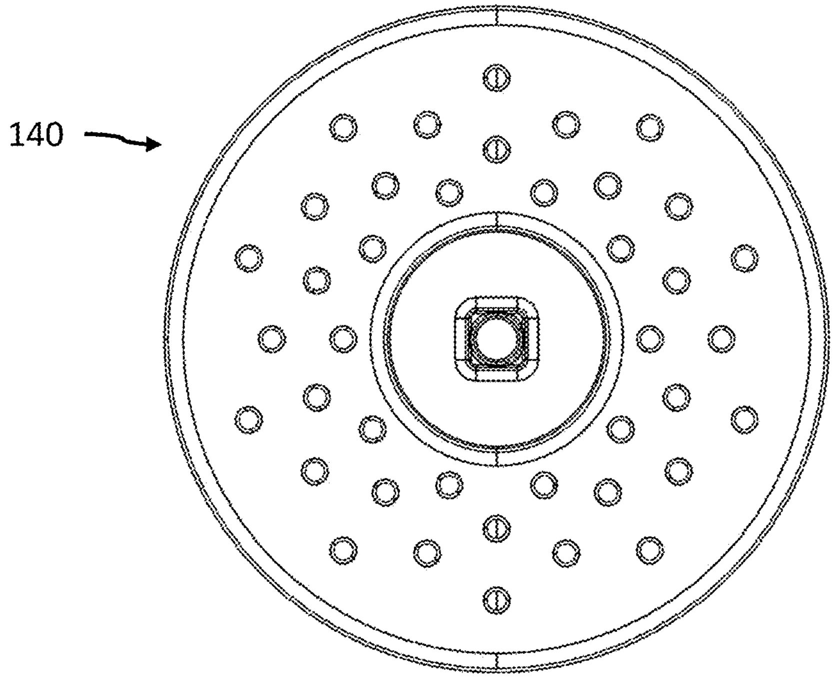
Figure 4D:
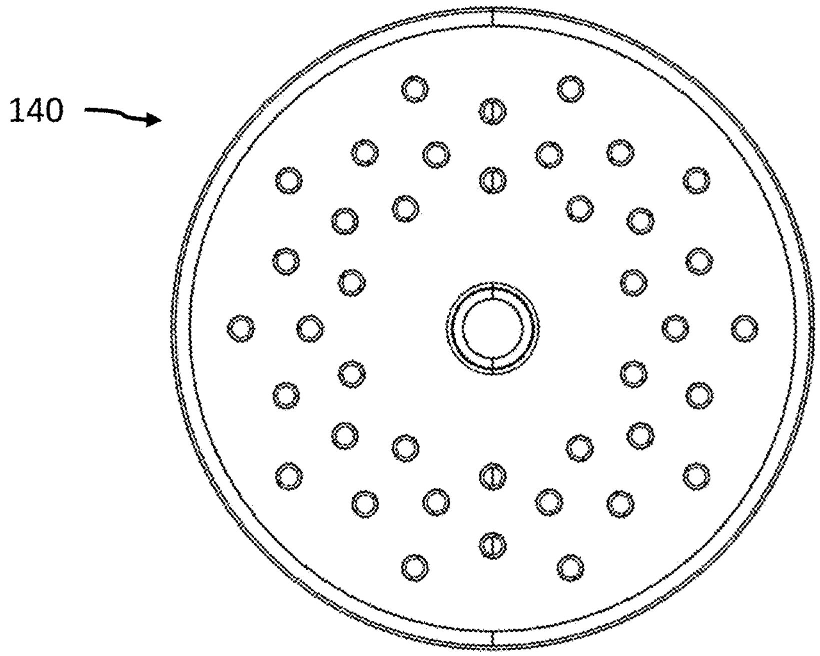
Figure 4E:
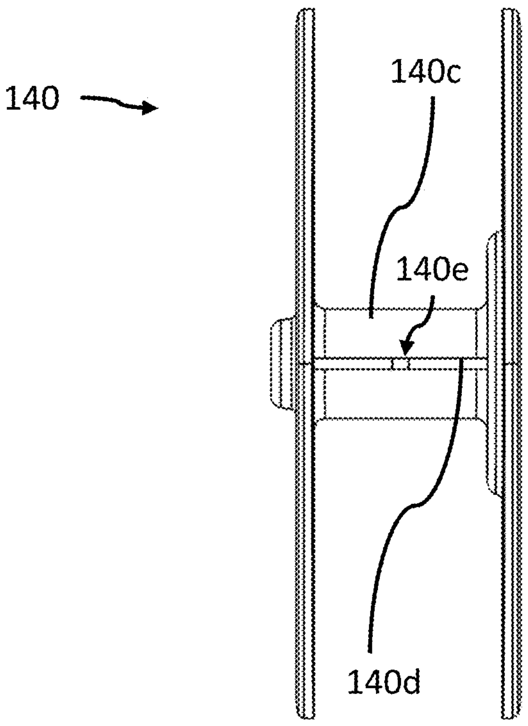
Figure 4F:
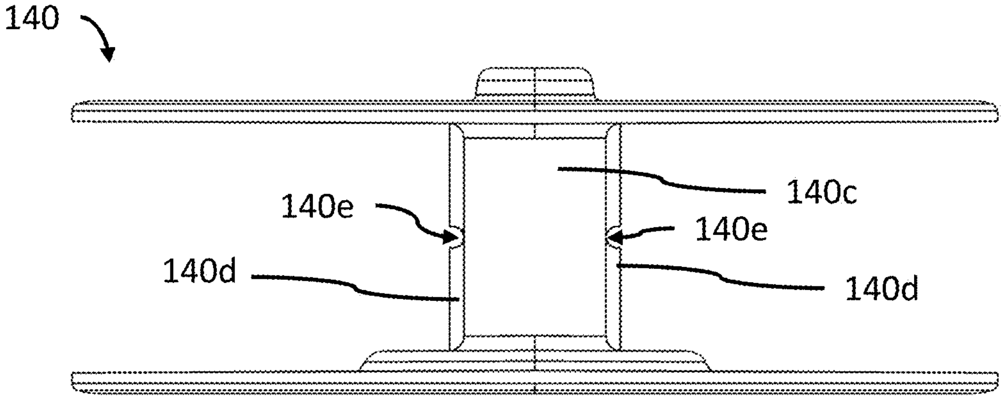

FIG. 4A-4F show various views of the spool according to an embodiment of the present disclosure. It may be appreciated that the views therein may be sufficiently appreciated for the ornamental appearance of the spools 140 as a whole, or for the arrangement of the apertures 200 on a sidewall 140*a* or 140*b*. In the view of FIG. 4B, the extension of the axial hub 140*c* between the sidewall 140*a* and the sidewall 140*b* may be appreciated. As shown in the views of FIG. 4E and FIG. 4F, the axial hub 140*c* may include bars 140*d* with notches 140*e*, which may facilitate holding an initial loop of the line 130 in the notches 140*e*. Other arrangements to secure the line 130 to the spool 140 may be utilized in other embodiments, including but not limited to a through hole extending in the axial hub 140*c*.

Figure 5:
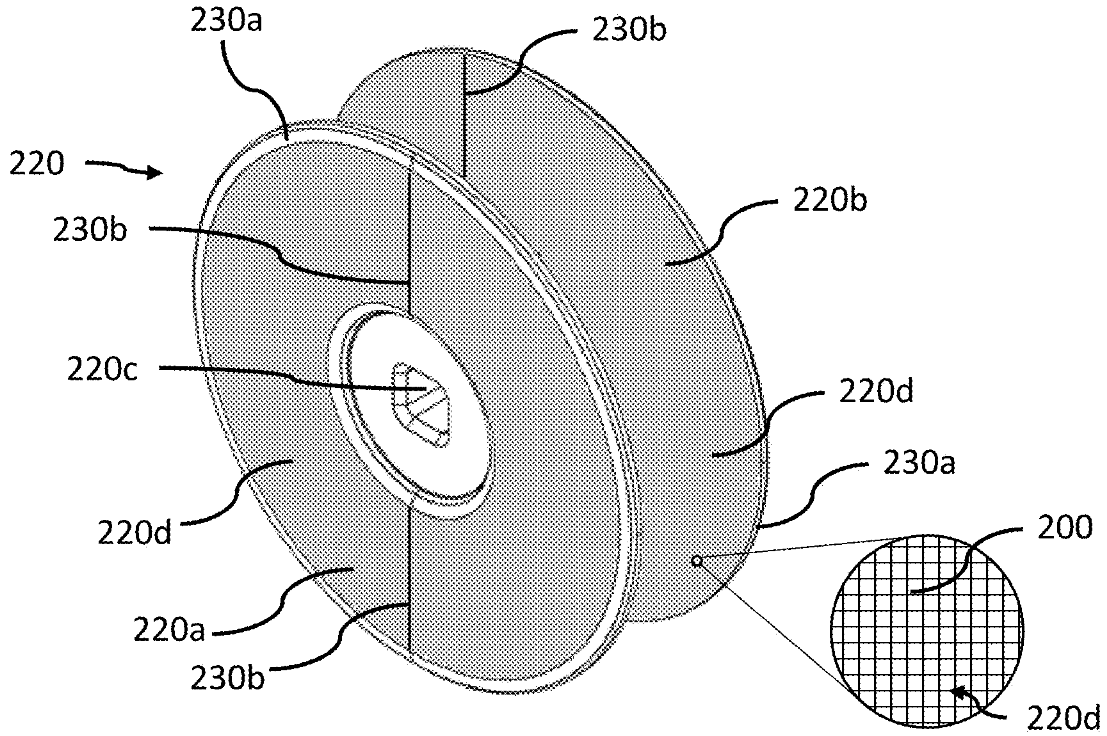
FIG. 5 illustrates a perspective view of another embodiment of a spool according to the present disclosure.
Figure 6:
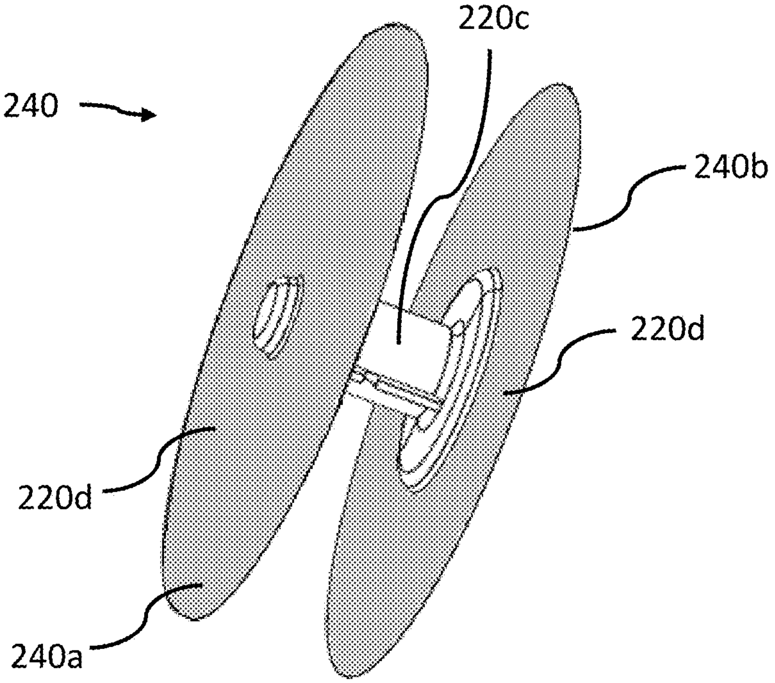
FIG. 6 illustrates a perspective view of another embodiment of a spool according to the present disclosure.

In some embodiments, the apertures 200 may be so plentiful on the sidewalls 140*a* or 140*b* that the sidewalls 140*a* or 140*b* approximate a mesh or perforated screen. In some embodiments, the sidewalls 140*a* or 140*b* may comprise a mesh material, including but not limited to metal mesh or plastic mesh, or a perforated material, including but not limited to perforated stainless steel or perforated aluminum. In some embodiments, these materials may define the bulk of the sidewalls 140*a* and/or 140*b*. For example, as shown in FIG. 5, a spool 220, which may be similar to spool 140 as described above in various regards except as discussed herein, may have sidewalls 220*a* and/or 220*b* that are joined by a hub 220*c*. The hub 220*c* may be similar to the hub 140*c* as described above. The sidewalls 220*a* and/or 220*b* may comprise or be formed from a mesh or perforated material 220*d* as described in greater detail below, forming a multitude of apertures 200 therein. As shown in the illustrated embodiment, the sidewalls 220*a* or 220*b* may include reinforcements 230, such as rims 230*a* or spokes 230*b*, to support the mesh or perforated material 220*d*. The reinforcements 230 may be formed from any appropriate material, including but not limited to metal or plastic, and in some embodiments may be formed from the same material as the hub 220*c*. In some embodiments, the mesh or perforated material 220*d* may be sufficiently rigid as to avoid the need for such reinforcements 230, as shown in the embodiment of the spool 240 illustrated in FIG. 6, where mesh or perforated material 220*d* defines the sidewalls 240*a* and 240*b* thereof extending from a hub 220*c* which may be similar to that described as to the spool 220.

The mesh or perforated material 220*d* may be of any appropriate construction or configuration, including but not limited to metal or plastic mesh. As a non-limiting embodiment, a metal mesh configuration may comprise stainless steel. It may be appreciated that chalk grain particles are typically approximately 15 microns, or 0.015 mm in size. In some embodiments, the aperture size of the mesh may be larger than such size so as to permit movement of chalk particles therethrough. For example, 635×635 mesh with a wire diameter of 0.0203 mm may define an aperture of 0.0203 mm, while 400×400 mesh with a wire diameter of 0.0254 mm may define an aperture of 0.37 mm. In an embodiment, a mesh material 220*d* may be similar to 200×200 mesh, which generally has apertures of 0.0737 mm. It may be appreciated that larger meshes may be utilized to accommodate larger dimensions X of lines 130. For example, a 5×5 mesh having a wire diameter of 1.04 mm has a larger aperture of approximately 4.04 mm, which may be utilized with a line 130 having a dimension X of approximately 2 mm. The weave method of the mesh material 220*d* may vary across embodiments, and may be configured as a plain weave, twill weave, Dutch weave, Dutch twill, or any other appropriate method of construction. Further, the mesh construction may be woven wire, welded wire, crimped wire, or so on. In still other embodiments, where the material 220*d* is a perforated material, the material be formed as perforated aluminum, perforated stainless steel, or perforated carbon steel.

In various embodiments, the chalk reels and components thereof described herein may be formed of metal, plastic, ceramic, or any other appropriate material. It may be appreciated that the components described herein may be of different constructions or configurations, including but not limited to one or more being comprised of different material choices. For example, the components described herein may each be constructed from a variety of materials, including but not limited to one or more of fabrics, plastics, metals, rubbers, elastomers, or any other appropriate material choice. For example, in an embodiment one or more of the components (e.g., the housing 110, the spool 140) may be formed of aluminum (e.g., machined aluminum), iron (e.g., steel), or any other appropriate material. Similarly, portions of the chalk reels may be formed from molded plastic, metal, or combinations thereof (e.g., plastic with metal supports or fasteners coupling portions tougher). In some embodiments, structural and functional components may be formed from metal or hard plastic, while gripped components positioned to engage the palm of a gripping hand to provide the palm with a comfortable gripping surface may be made of a suitable molded plastic material or elastomeric material, and may be generally formed as a bi-material suitable molded plastic material coated with a layer of an elastomeric material, such as a rubber based material. In some embodiments, the material choices may differ from component to component (e.g., a metal housing 110 and a plastic spool 140). In various embodiments, some components may be integrally formed together, while other components may be assembled by any appropriate mechanism, including but not limited to fastened, welded, snap-fit, friction fit, adhesive bonding, or other appropriate securements.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A chalk reel comprising:

a housing defining a chalk chamber and an opening from the chalk chamber;

a spool positioned within the chalk chamber; and a line wound on the spool and extending through the opening, the line having a width of dimension X;

wherein the spool comprises an axial hub and a sidewall;

wherein the sidewall comprises a plurality of apertures extending through the sidewall from a first face distal from the axial hub to a second face proximal to the axial hub;

wherein each of the plurality of apertures having a maximum width of dimension Y;

wherein the dimension Y is smaller than a size of a loop of the line, so that no loops of the line may fit through each of the plurality of apertures.

2. The chalk reel of claim 1, wherein the dimension X is a compressed width of the line.

3. The chalk reel of claim 2, wherein the dimension X is approximately between 0.25 mm and 1.25 mm.

4. The chalk reel of claim 1, wherein the dimension X is approximately between 0.5 and 2.5 mm.

5. The chalk reel of claim 1, wherein the dimension Y of each of the plurality of apertures is greater than 0.015 mm.

6. The chalk reel of claim 1, wherein the plurality of apertures comprises greater than twenty apertures.

7. The chalk reel of claim 1, wherein the spool comprises a second sidewall opposite the axial hub from the first sidewall.

8. The chalk reel of claim 7, wherein the plurality of apertures is formed on both the first sidewall and the second sidewall.

9. The chalk reel of claim 8 wherein the plurality of apertures comprises greater than forty apertures.

10. The chalk reel of claim 1 wherein the line is formed from one or more of nylon, polyester, and cotton.

11. The chalk reel of claim 1, wherein the spool is formed from one or more of metal and plastic.

12. The chalk reel of claim 1, wherein the sidewall comprises a mesh or perforated material defining the apertures.

13. The chalk reel of claim 12, wherein the sidewall is defined by the mesh or perforated material.

14. The chalk reel of claim 13, further comprising reinforcements to support the mesh or perforated material.

15. The chalk reel of claim 1, wherein dimension Y is less than or equal to approximately twice dimension X.

16. The chalk reel of claim 15, wherein the dimension Y is less than approximately twice the dimension X.

* * * * *